United States Patent [19]

Nakagawa et al.

[11] Patent Number: 5,167,453
[45] Date of Patent: Dec. 1, 1992

[54] TEMPERATURE DATA RECORDER

[76] Inventors: George Nakagawa; Robert M. Nakagawa, both of 1812 Dakota Ave., Modesto, Calif. 95351

[21] Appl. No.: 780,771

[22] Filed: Oct. 22, 1991

[51] Int. Cl.⁵ .......................................... G01K 01/02
[52] U.S. Cl. ............................. 374/186; 346/33 TP; 346/136
[58] Field of Search .............. 73/186; 346/33 TP, 136

[56] References Cited

U.S. PATENT DOCUMENTS

| | | |
|---|---|---|
| 3,167,966 | 2/1965 | Ashleman . |
| 3,910,119 | 10/1975 | Maxwell . |
| 3,919,632 | 11/1975 | Roerty . |
| 4,007,637 | 2/1977 | Nakagawa et al. . |
| 4,135,400 | 1/1979 | Maxwell et al. . |
| 4,755,063 | 7/1988 | Nakagawa et al. ................. 374/186 |

Primary Examiner—Daniel M. Yasich
Attorney, Agent, or Firm—Philip A. Dalton

[57] ABSTRACT

A recorder is disclosed for producing a continuous data record and comprises a case, a strip chart which is wound from a chart storage compartment onto a spring-driven take-up spool, and a speed-reducing governor comprising a gear train which is operatively connected to a hub and spoke assembly immersed in small spheres or balls, preferably of environmentally impervious material such as glass. The sphere-immersed paddle wheel approximates the drag of viscous fluid systems, with advantages which include independence of drag characteristics from temperature variation, simplicity, and easy speed adjustment, that is, the size of the spheres can be used to change the speed of the recorder.

6 Claims, 3 Drawing Sheets

TEMPERATURE DATA RECORDER

Background of the Invention

This invention relates to data recorders and, in particular, to a temperature recorder which transfers a strip chart between a spool and a chart feed compartment at a controlled speed independent of temperature.

DESCRIPTION OF THE STATE OF THE RELEVANT TECHNOLOGY

The state of the relevant technology is thought to be disclosed in our U.S. patent 4,755,063, issued Jul. 5, 1988. The '063 patent discloses a portable, temperature-compensated temperature recorder comprising a case, a strip chart which is wound from a chart storage compartment onto a spring-driven take-up spool, and a speed-reducing governor comprising a paddle wheel which is immersed in viscous fluid and is operatively connected to the driven take-up spool by a gear train. Temperature compensation, that is, compensation for ambient temperature-induced variations in the viscosity of the paddle wheel fluid is provided by the use of temperature-responsive paddles which extend and retract in response to variations in the ambient temperature, thereby compensating for viscosity changes in the fluid. The U.S. Pat. No. 4,755,063 is incorporated by reference.

SUMMARY OF THE INVENTION

It is an object of the present invention to provide a temperature recorder in which the transfer speed of the strip chart and, thus, the operation is independent of temperature.

In one aspect, our present invention which achieves the above and other objectives is embodied in a data recorder which comprises: a case; a take-up spool rotatably mounted inside the case; a chart feed compartment mounted inside the case for mounting a strip chart therein extending to the take-up spool; drive means connected to the take-up spool for rotating the take-up spool at a controlled speed, thereby transferring the chart between the feed compartment and the take-up spool; a recording mechanism mounted inside the case, and including a movable stylus mechanism for scribing on the winding chart; and governor means operatively connected to the take-up spool for effecting control of the transfer speed independent of temperature.

The drive means preferably is a substantially constant torque mechanism, such as a spring.

In another aspect, our data recorder comprises: a case; a take-up spool rotatably mounted inside the case; a chart feed compartment mounted inside the case for mounting a strip chart therein extending to the take-up spool; drive means connected to the take-up spool for rotating the take-up spool at a controlled speed, thereby transferring the chart between the feed compartment and the take-up spool; a recording mechanism mounted inside the case, and including a movable stylus mechanism for scribing on the chart; and governor means operatively connected to the take-up spool for effecting control of the transfer speed independent of temperature. The governor means comprises a gear train operatively coupled at a first end to the take-up spool and at the second end to a speed stabilization device. The speed stabilization device comprises a compartment containing a multiplicity of glass spheres, a hub mounted to a shaft extending through the axis of the gear forming the second end of the gear train, and at least one projection such as a tine extending from the hub such that when the gear train rotates the hub the projection traverses a path through the multiplicity of spheres. Typically, the stylus is temperature responsive for recording temperature on the moving chart. Two or more tines are preferred which project in different directions such that when the hub is rotated each tine traverses a different path through the multiplicity of spheres thereby preventing channeling of the spheres.

BRIEF DESCRIPTION OF THE DRAWINGS

The above and other aspects of my present invention are described with respect to the drawings, in which:

DETAILED DESCRIPTION OF THE PREFERRED EMBODIMENT(S) Overall Construction and Operation FIGS. 1 and 2 are, respectively, a top plan view, partially in section, and a vertical crosssection view of an exemplary temperature recorder 10 which incorporates our improved, temperature independent governor system.

Figure 1:
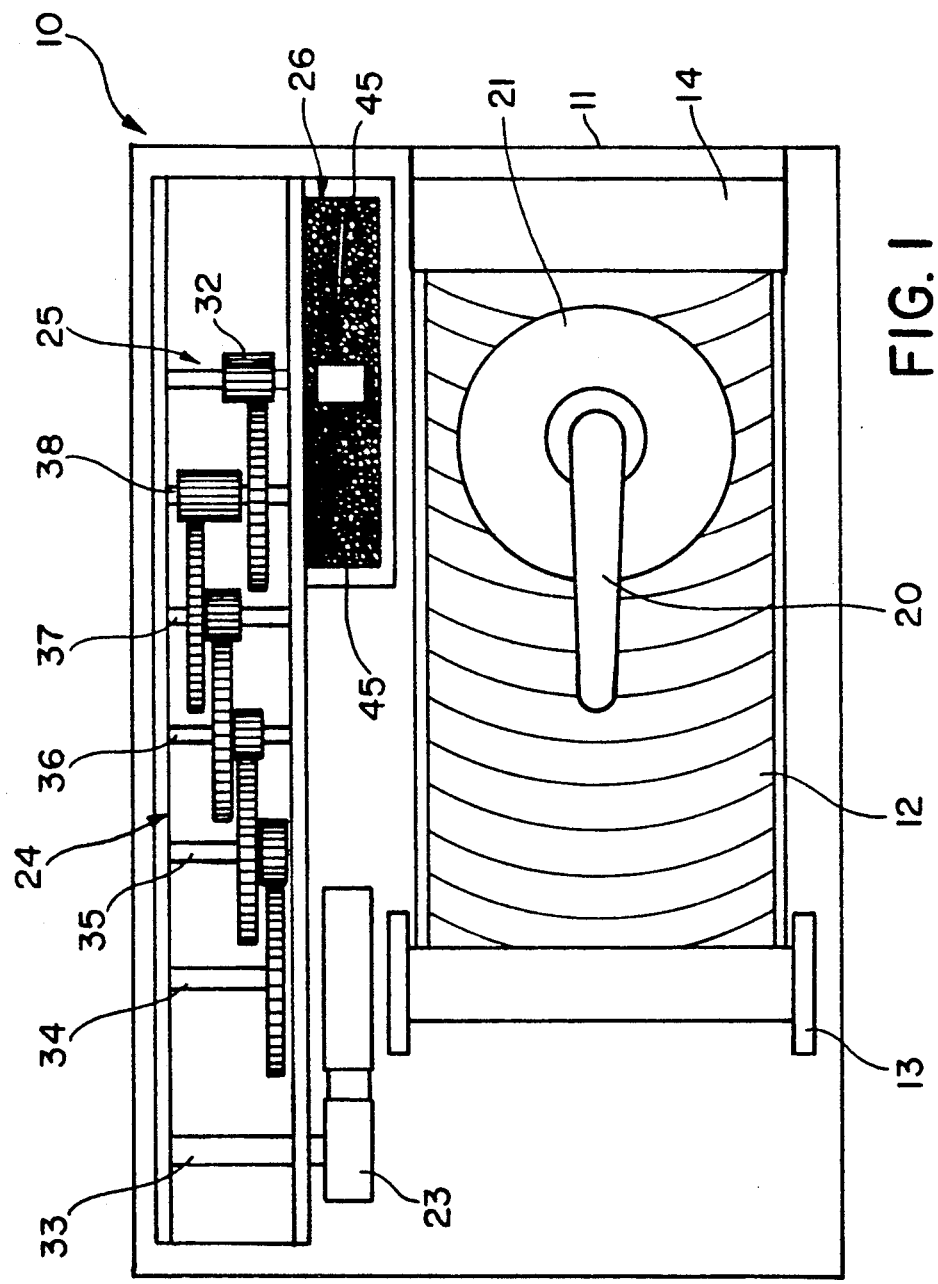
FIG. 1 is a top plan view, partially in section, of an exemplary data recording device with upper portions of its case broken away, which incorporates our improved, temperature independent governor in accordance with one embodiment of our present invention.
Figure 2:
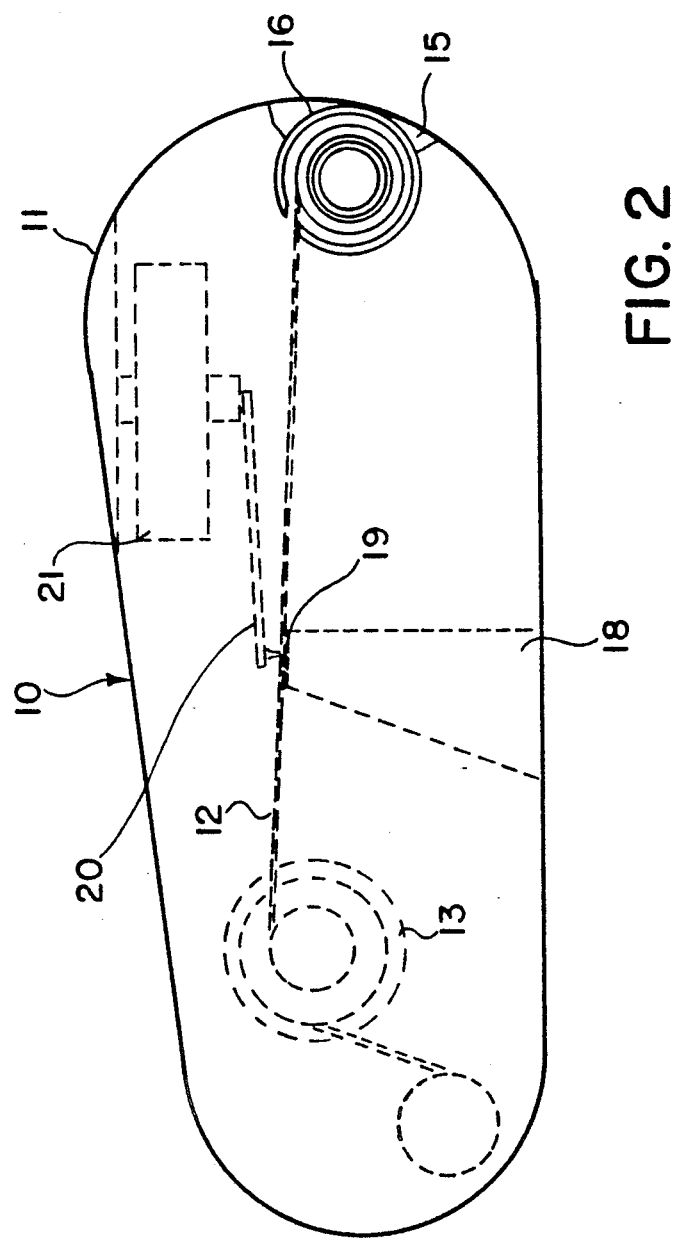
FIG. 2 is a vertical cross-sectional view of the temperature recorder of FIG. 1.

In one embodiment, the recorder 10 comprises a case 11 which typically comprises separate upper and lower sections. A recording chart 12 is removably mounted at one of its ends to take-up spool 13, for example, by inserting one end of the chart into a receiving slot in the spool 13, and the opposite end is rolled and contained in a chart storage compartment 16. The storage compartment 16 is mounted to a bracket 15 which is mounted to the case 11. Alternatively, the opposite end of the chart 12 can be mounted to a feed spool (not shown). As a result of this mounting arrangement, rotation of the take-up spool 13 unwinds the chart 12 from the chart storage compartment 16 and over the angled upper surface 19 of a writing pad support 18 which supports the chart 12 beneath writing stylus 20.

The stylus 20 is part of a coil-type temperature-responsive writing mechanism 21, of the type described in our incorporated '063 patent, which is mounted to the upper portion of the case 11. Temperature-induced winding or unwinding of the coil produces a pivotal recording movement of the stylus 20, which effects recording the temperature, including varying temperature, on the moving strip chart 12.

The take-up spool 13 preferably is driven by a constant torque drive means 23, which can be any conventional means for imparting a substantially constant (predictable) torque. However, for the combination of operating characteristics, convenience and low cost, we prefer a constant-torque spring motor as the power source 23. One such spring motor is available from Stock Drive Products company as model designation ML 1448. Such a power source is characterized by a flat decay rate profile from fully-wound to nearly-unwound conditions and is a contributing, but not sufficient, factor in the overall accuracy and temperature independence of our recorder. In the preferred embodiment, the coil spring drive means 13 is mounted to fixed shaft 33 and imparts a torque to input shaft 34. The input shaft extends through and is mounted to the rotational axis of the take-up spool 13.

Governor

To govern the rate at which the strip chart 12 is advanced, the data recorder includes a non-fluid governor system 24, comprising a speed reduction gear train assembly or an increasing speed gear train assembly 25 and a speed-stabilization system 26.

Figure 3:
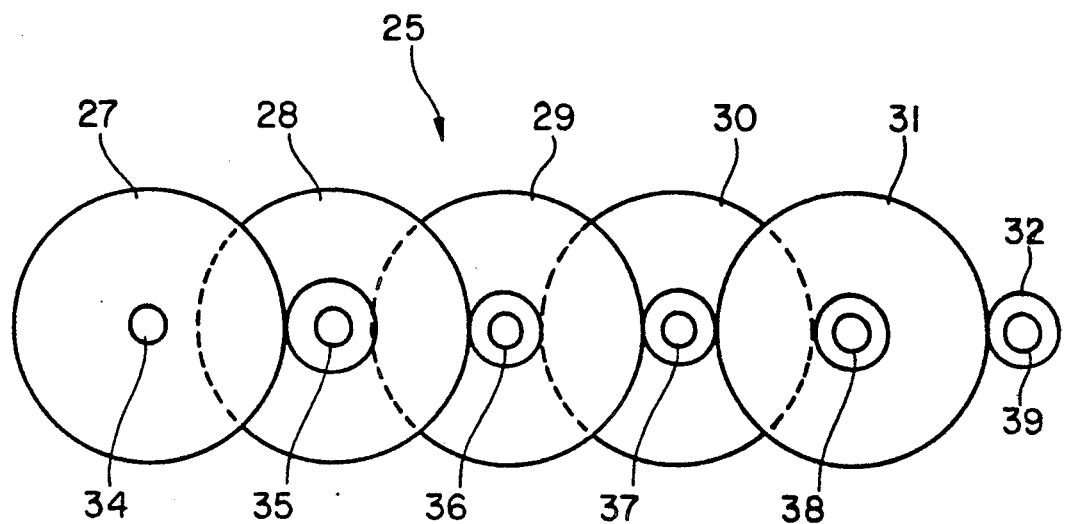
FIG. 3 is a schematic diagram of the gear train portion of the governor of FIG. 1.

Referring to FIGS. 1 and 3, the gear train assembly 25 includes spur gear 27 which is mounted on input shaft 34 and is operatively connected by intervening gears 28-31 to a pinion gear 32 which is mounted on output shaft 39, which is part of the novel non-fluid, hub and spoke assembly. That is, the spur gear 27 meshes with spur/pinion gear 28 which is mounted on shaft 35 and in turn meshes with spur gear 29 mounted on shaft 36. The spur gear 29 meshes with another spur gear 30 on shaft 37. Spur gear 30 in turn meshes with still another spur gear 31 which is mounted on shaft 38 and meshes with the pinion gear 33 mounted on output shaft 39. Various ratios are of course possible based upon gear selection. One suitable choice, and the present choice used in our recorder, is a speed-increasing gear train ratio of 700-800:1.

During the operation of the data recorder, the constant torque drive means 23 rotates input shaft 34, which effects rotation of pinion gear 32 via the intervening gear train, causing the substantial multiplying effect in angular velocity of the output shaft.

Figure 4:
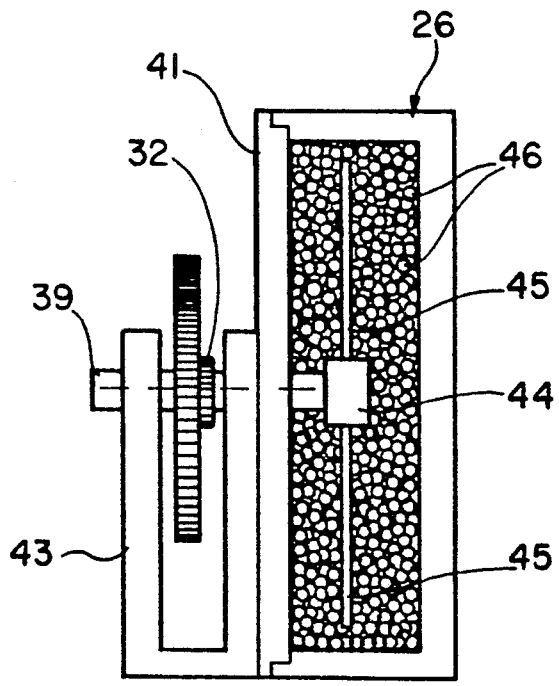
FIG. 4 is a side plan view, partially in section, showing a portion of the governor of FIG. 1.

Referring now to FIGS. 1, 3 and 4, the gear train output shaft (speed stabilization unit input shaft) 39 is rotatably journaled to one wall of paddle wheel/hub compartment 41 by a U-configured mounting yoke 43 arrangement. A hub 44 is mounted at one end of output shaft 39. One or more spokes 45, and preferably two or more such spokes, are mounted to and extend radially outwardly from the hub. In the presently preferred embodiment, the spokes 45—45 are thin metal tines. The compartment 41 is filled with small balls in the form of small hollow glass spheres, through which the tines 45—45 rotate under power by the constant torque source, thereby effecting the desired drag on the gear train 25 and, in combination with the gear train, providing a constant, very slow rotation (typically, one revolution per minute). This rotational speed can be varied by the number and/or length of the tines. Preferably, the tines 45—45 are not aligned, so as to follow the same path through the glass balls, because this configuration could cause channelling. Rather, the spines are offset relative to one another (see FIG. 1), to preclude the possibility of channelling. Also, preferably the spheres are tiny, e.g., 0.177 micrometers in diameter, to simulate constant viscous drag characteristics. 65 micron and 177 micron spheres are available from the 3M Corporation.

Surprisingly, we have found that this nonfluid, "solid" glass sphere/paddle system effects substantially constant viscous drag on the drive system, much in the manner of the viscous fluid gear train drag system used in system disclosed in the '063 patent. Furthermore, unlike the fluid immersion approach disclosed in the '063 patent, our glass sphere/paddle wheel system is unaffected by, that is, is independent of, temperature variations. The result is a physically simple, constant speed, temperature-independent system which does not employ a fluid immersion gear train system or a temperature-compensation device/system, and thus does not require leak-proof, sealed compartments or the effective but relatively expensive temperature-responsive, temperature-compensating paddle wheel system of the '063 patent.

In addition to the above-summarized advantages our system has the additional advantage of being readily adjustable, readily "tunable", to accommodate variables, such as the variations in spring rates, internal friction, etc. Preferably, we adjust or make up for the variables "externally", ie., by mating pre-tested/pre-sorted timers to take-up spools of varied diameters. Thus, and referring to Table 1, the timing mechanisms used in the recorder are tested to determine their speed of operation relative to a desired standard (e.g. 1.18 inches per 24 hr, column 4), and then, depending on the variation from standard (see column 1), are mated with spools of size selected to compensate for variations from the standard (column 3). Conveniently, the spools can be pre-sorted by size, using color-coding, numbers, or other types of indicia to ensure accuracy (column 2).

TABLE 1

| 1<br>IF TIMER TEST<br>INDICATES: | 2<br>USE<br>SPOOL<br>CODED: | 3<br>SPOOL<br>DIAM-<br>ETER<br>(INCHES) | 4<br>CHART<br>MOVEMENT<br>PER 24<br>HR. TEST<br>(INCHES) |
|---|---|---|---|
| +18 to +20% FAST | VF | .315 | 1.18 |
| +11 to +13% FAST | F | .335 | 1.18 |
| +5 to +7% FAST | BF | .355 | 1.18 |
| −2 to +2% | ON | .375 | 1.18 |
| −4 to −6% SLOW | BS | .395 | 1.18 |
| −9 to −11% SLOW | S | .415 | 1.18 |
| −13 to −15% SLOW | VS | .435 | 1.18 |

In view of the preferred and alternative embodiments of our present invention described here, those of usual skill in the art will readily derive modifications and embodiments that are within the scope of the present invention as defined by the appended claims.

We claim:

1. A data recorder, comprising:
   a case;
   a take-up spool rotatably mounted inside the case;
   a chart feed compartment mounted inside the case for mounting a strip chart thereon extending to the take-up spool;
   drive means connected to the take-up spool for rotating the take-up spool at a controlled speed, thereby transferring the chart between the feed compartment and the take-up spool;
   a recording mechanism mounted to the frame, and including a movable stylus mechanism for scribing on the chart; and
   governor means operatively connected to the take-up spool for effecting control of the transfer speed independent of temperature, the governor means comprising a gear train operatively coupled at a first end to the take-up spool and at the second end to a speed stabilization device, and a temperature-independent speed stabilization device comprising a compartment containing a multiplicity of glass spheres, a hub mounted to a shaft extending through the axis of the gear forming the second end of the gear train, and at least one projection extending from the hub such that when the gear train rotates the hub the projection traverses a path through the multiplicity of spheres.

2. The recorder of claim 1, wherein the projection comprises a tine.

3. The recorder of claim 2, wherein the stylus mechanism is temperature responsive for recording on the chart variations in temperature.

4. The recorder of claim 1, wherein the projection comprises at least two tines extending from the hub in different directions such that when the hub is rotated each tine traverses a different path through the spheres thereby preventing channeling of the spheres.

5. The recorder of claim 4, wherein the tines are wire tines.

6. The recorder of claim 5, wherein the stylus mechanism is temperature responsive for recording variations in temperature on the chart.

* * * * *